May 31, 1927.
H. W. HEESCH
1,630,296
RECORDER PEN ARM RELEASE
Filed Dec. 26, 1923
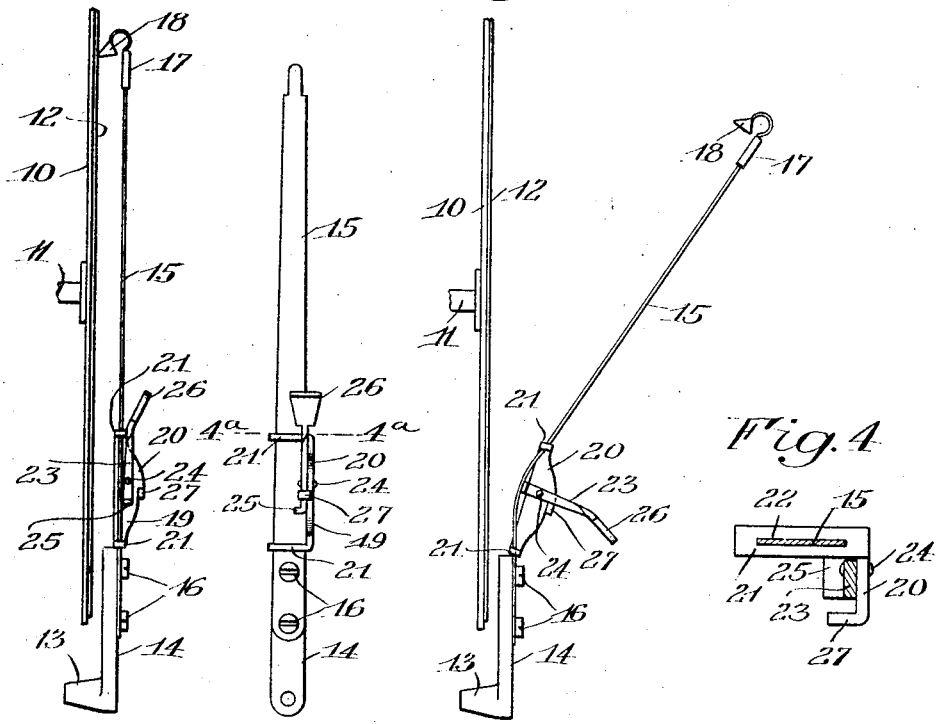
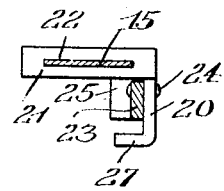
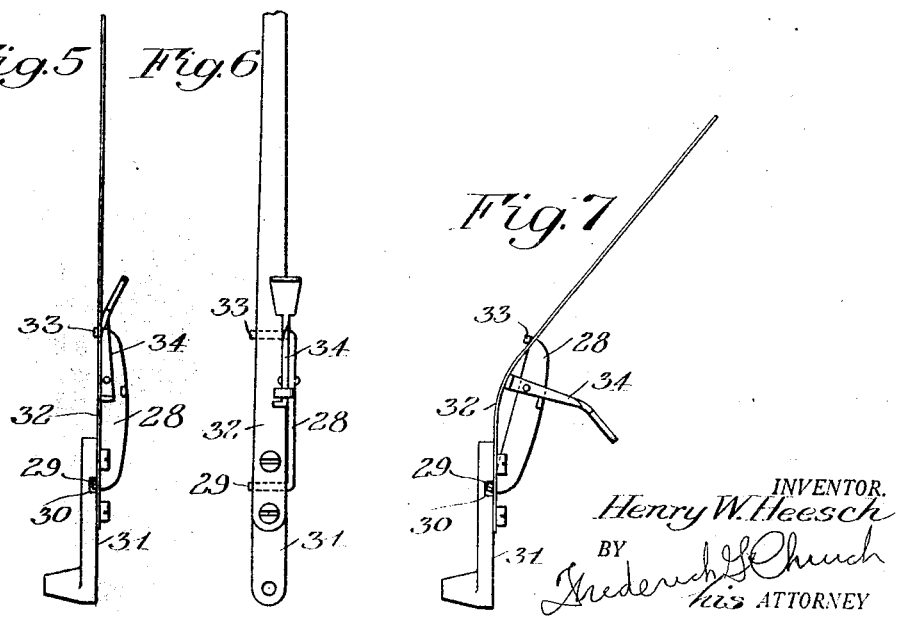
INVENTOR.
Henry W. Heesch
BY
his ATTORNEY Patented May 31, 1927.

1,630,296

UNITED STATES PATENT OFFICE.

HENRY W. HEESCH, OF ROCHESTER, NEW YORK, ASSIGNOR TO TAYLOR INSTRUMENT COS., OF ROCHESTER, NEW YORK, A CORPORATION OF NEW YORK.

RECORDER-PEN-ARM RELEASE.

Application filed December 26, 1923. Serial No. 682,609.

This invention relates to instruments for recording temperatures, pressures and other conditions, comprising a pen arm movable over a record surface in accordance with variations in the condition to be recorded, and more particularly to the variety of such instruments provided with means for moving the pen out of contact with the record surface or chart for replacing the latter or for refilling the pen or other purposes, the chief object of the invention being to provide a simple, practical and convenient pen manipulating device of this character readily applicable to pen arms of a variety in general use. More specifically stated, it is an object of the invention to provide a device of this variety in the form of an attachment for pen arms of the resilient construction in common use and operating to releasably flex and retain the arm with its pen removed to a distance from the record surface.

To these and other ends, the invention resides in certain improvements and combinations of parts all as will be hereinafter more fully described, the novel features being pointed out in the claims at the end of the specification.

In the drawings:

Fig. 1 is a side elevation of a portion of a recording instrument having the present invention applied thereto.

Fig. 2 is a front elevation of the same.

Fig. 3 is a view similar to Fig. 1 showing the parts in a different position.

Fig. 4 is an enlarged sectional view on the line 4ª—4ª in Fig. 2 and

Figs. 5, 6 and 7 are views similar to Figs. 2 and 3, respectively, but showing a modified form of construction.

Similar reference numerals throughout the several views indicate the same parts.

The present invention provides a device in the nature of an attachment for a recorder pen arm of the variety constructed of resilient metal for holding the pen against the record surface and adapted to be bent away from the record surface for example to free the chart for replacement, to discontinue the making of a record, afford access to the pen and similar purposes. Referring more particularly to the drawings, the present embodiment comprises the application of the invention to a recording instrument of the variety comprising a chart disc 10, Fig. 1, supported and rotated by means of a spindle 11 connected with a suitable time train, the disc having secured to the face thereof in any suitable manner a record chart 12. The marking means in the present instance comprises a hub 13 rotated by any suitable mechanism in response to variations in the temperature pressure or other condition to be recorded, as well understood in the art, for swinging a pen arm. The latter is shown as comprising a rigid portion 14 fixed radially to the hub and a flexible extension portion 15 constructed of a strip of flexible resilient metal and secured to the rigid portion 14 as by means of screws 16. The outer end of the arm portion 15 is adapted to have detachably fitted thereto a shank 17 of a pen 18 of the usual or any suitable variety, the above construction being one of a number well known in the art with which the invention may be combined.

The pen manipulating device of the present invention is preferably in the nature of an angular clip 19 which may be economically struck up from sheet metal to provide a plane shaped body portion 20 adapted to lie parallel with the flexible arm portion 15 at one side thereof as shown in Fig. 1. Spaced portions of member 19, and preferably its ends, are turned angularly transversely of the pen as at 21 for engagement with the latter. In the modification shown in Figs. 1 to 4, these end portions are formed with eyes 22, Fig. 4, through which the pen arm may be slidably threaded as shown, the member 19 in this form being in the nature of a detachable rider adapted to be conveniently positioned on the pen arm and preferably adjacent the lower end of flexible portion as shown.

The ends of member 19 thus engage the pen arm at spaced points for the latter and an element is adjustably mounted on the member for movement to position to flex or bend the arm outwardly from the record surface. Preferably such element is in the nature of a lever 23 pivoted between the ends 21 of member 19 as at 24 and having the end of one arm turned laterally to provide a finger 25 for engagement with the pen arm. The other end of the lever is conveniently formed with a finger piece 26 for swinging the same from the inactive position shown in Figs. 1 and 2, in which position the pen arm is unaffected to the position shown in Fig. 3 in which the arm is bowed or flexed as shown by the engagement therewith of finger 25 between the ends 21 of the rider. A stop lug 27 is formed on member 19 in such position that it is engaged by lever 23 when the latter is swung slightly past center position relative to its contact with the pen arm, for releasably retaining the lever in active position.

The device is thus adapted for application to recorder pen arms of a variety in common use and when so attached a simple movement of lever 23 serves to move and retain the pen in a position spaced from the record surface. Upon returning the lever to initial position, the pen arm is released and returns the pen or other marking element into contact with the recording surface.

In the modification of the invention shown in Figs. 5, 6 and 7 the device comprises a member 28 similar to the rider 19 described above except that in this instance the member carries at one end a transversely extending stud 29 working in a recess 30 in the rigid arm portion 31 in which recess the stud is retained by the overlapping of the flexible arm portion 32. The other end of member 28 carries a transversely extending stud 33 for engagement with the back of the flexible arm portion, and member 28 has pivoted thereon a lever 34 similar in construction, arrangement and operation to the lever 23 already described. In this modification also a simple pivotal adjustment of the lever serves to either bend the pen arm to carry the pen out of contact with the recording surface or to release the arm for returning the pen to operating position.

As apparent from the above description, the invention provides an exceedingly simple, practical and economical device adapted for attachment to a common variety of pen arm for conveniently moving and holding the pen at a distance from the record surface or chart to facilitate replacement of the latter, for example without smearing the ink or injuring the pen or pen arm.

I claim as my invention:

1. The combination with a flexible pen arm for recording instruments, of a relatively rigid piece engaging the arm at two points and a lever mounted on said piece and operable to press upon the arm portion intermediate said points to flex it out of the plane passing through said points.

2. The combination with a flexible pen arm for recording instruments of an attachment comprising a member having portions arranged for engagement with the arm at spaced points thereof, a lever pivoted on said member between said portions for movement to bring an end thereof into flexing engagement with the arm, and a stop arranged to releasably retain said lever in said flexing position to hold said arm out of contact with a record surface.

3. As an article of manufacture, an attachment for the flexible pen arm of a recording instrument, comprising a member having end portions for engagement with one face of the arm and lever mechanism carried by the said member for pressing upon the opposite face of the arm intermediate said end portions.

4. As an article of manufacture, an attachment for the flexible pen arm of a recording instrument comprising a rider having end portions for sliding engagement with the arm and through which said arm is adapted to be threaded, and an element adjustably mounted on the rider between said end portions for engaging and flexing said arm to clear a record surface.

HENRY W. HEESCH.